W. V. TURNER.
AUTOMATIC AIR BRAKE.
APPLICATION FILED APR. 20, 1906.
945,063.
Patented Jan. 4, 1910.
2 SHEETS—SHEET 1.
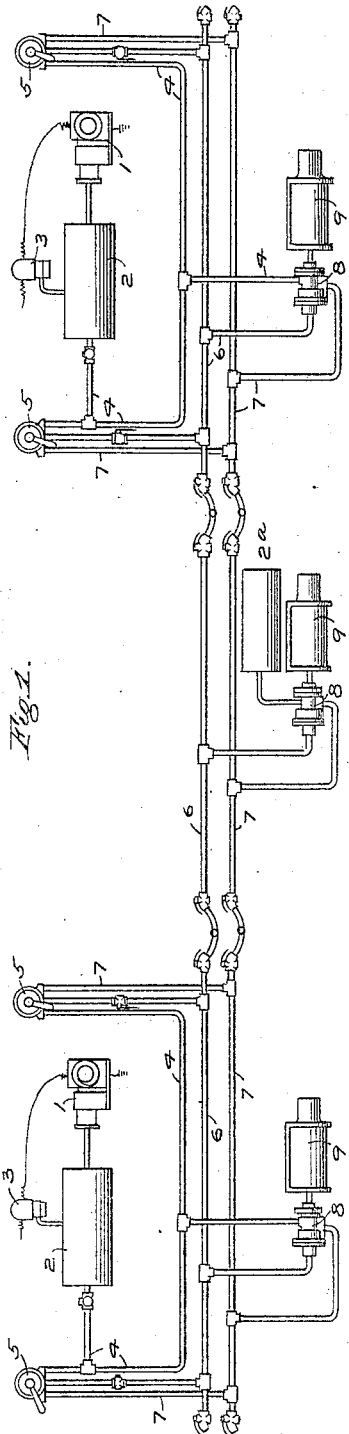
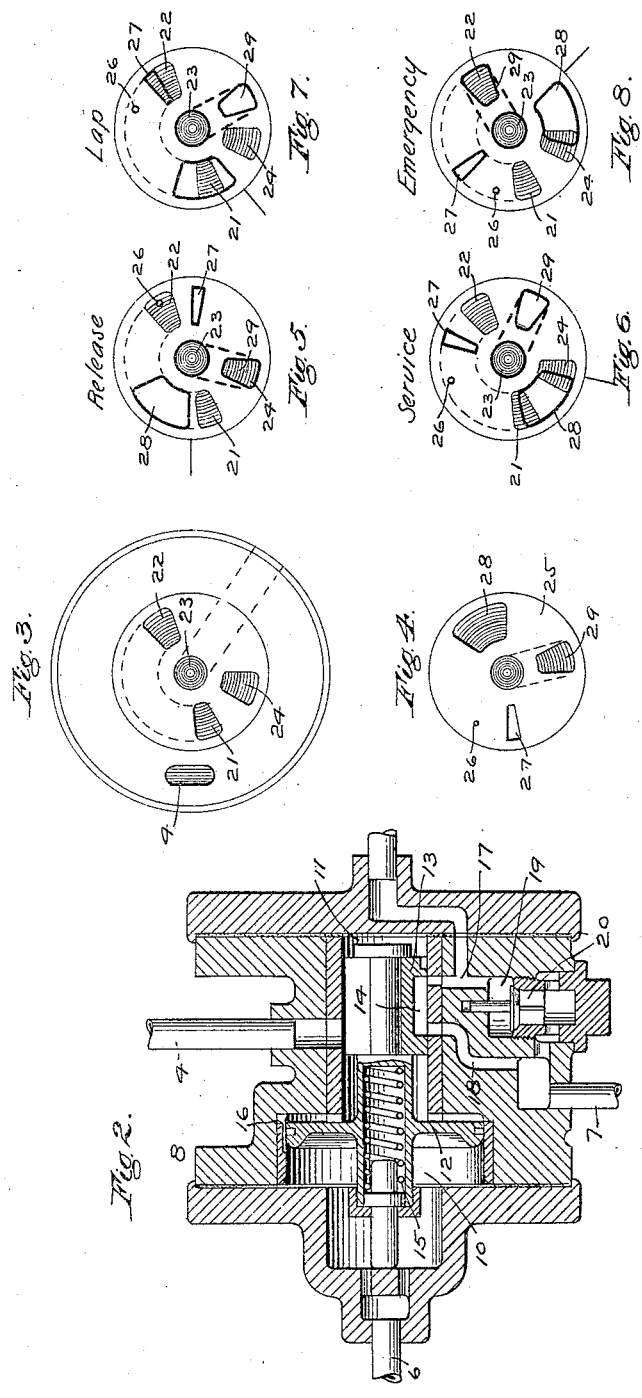
WITNESSES
INVENTOR
Walter V. Turner
by E. Wright
Att'y.

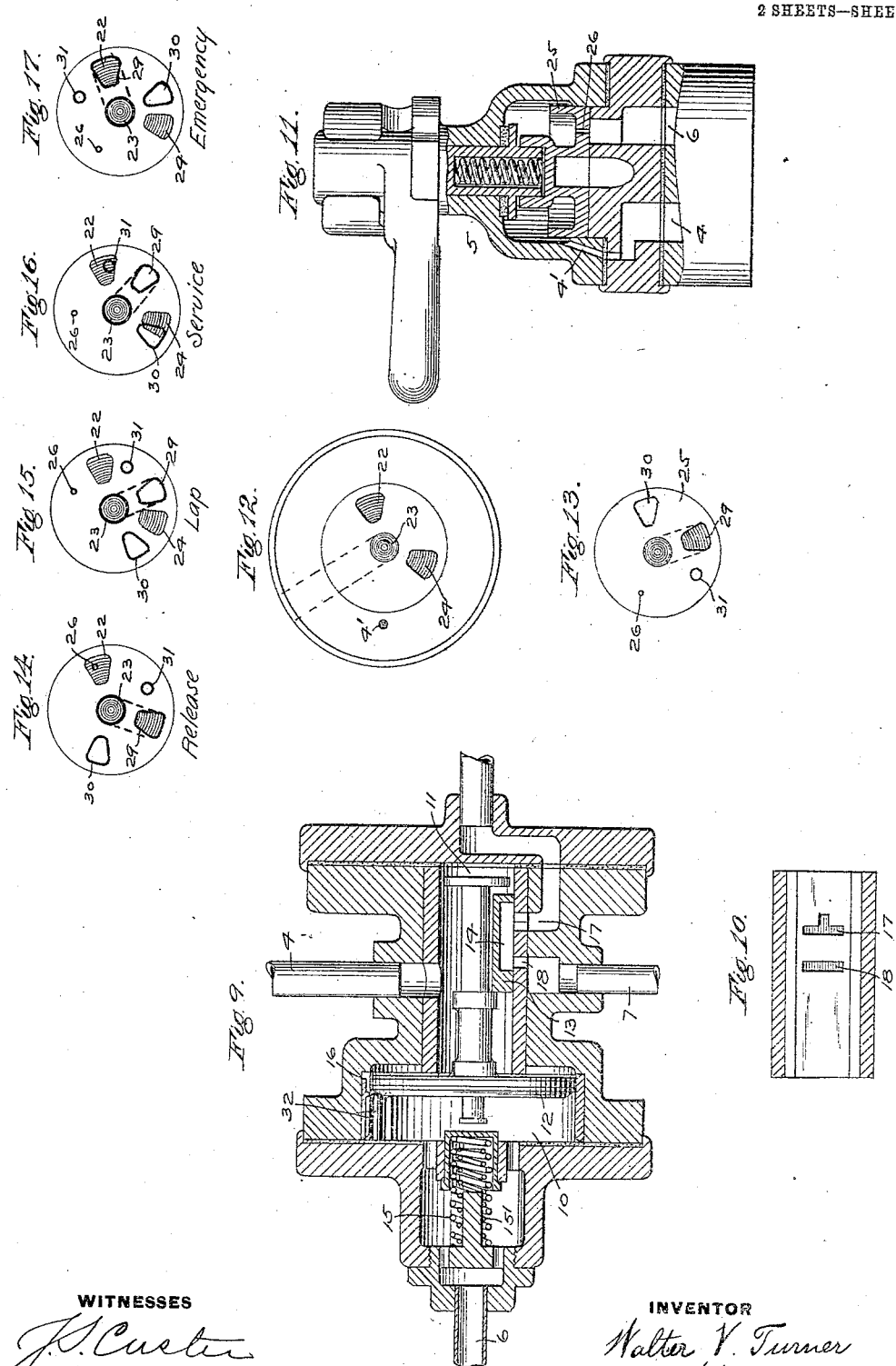

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

AUTOMATIC AIR-BRAKE.

945,063.  Specification of Letters Patent.  Patented Jan. 4, 1910.

Application filed April 20, 1906. Serial No. 312,805.

*To all whom it may concern:*

Be it known that I, WALTER V. TURNER, a citizen of the United States, residing in Edgewood, in the county of Allegheny and State of Pennsylvania, have invented certain new and useful Improvements in Automatic Air-Brakes, of which the following is a specification.

This invention relates to automatic air brakes for railway cars, and is particularly designed for use in electric traction service, such as street cars, where it is desired to operate the cars sometimes as single units, and at other times in trains composed of two or more motor cars, or one or two trailer cars coupled up with one or more motor cars.

The main object of this invention is to provide an improved automatic air brake equipped for this class of service in which two or more motor cars or motor and trailers are operated together, each motor car equipment usually comprising a motor driven air compressor, a main reservoir, pump governor, brake pipe line, triple valve device, brake cylinder, and a brake valve, usually one at each end of the car, for controlling the brake pipe pressure and operating the brakes. The trailer cars are usually not provided with air compressors, governors or brake valves, but have an auxiliary reservoir which is normally charged with compressed air from the train brake pipe.

One of the features of my improvement comprises an automatic application valve device adapted to be operated by a reduction in the brake pipe pressure in service applications to open communication from the reservoir to the brake cylinder, and having means, such as a light spring, for returning said valve to its normal position for closing such communication immediately upon moving the brake valve to intermediate or lap position, or when the pressures substantially equalize upon opposite sides of the automatic valve piston, the brake cylinder release being controlled by the brake valve.

Another feature of my improvement comprises a release pipe connected to the brake valve and communicating with the brake cylinder for controlling the release, the automatic valve device being adapted to close communication from the brake cylinder to the release pipe in emergency applications of the brake.

According to another feature of my improvement, the brake valve is designed to vent air from the train brake pipe to the release pipe and the brake cylinder in making reductions for causing the automatic valve device to operate in service applications.

In a motor car equipment having only a single main reservoir, the automatic application valve device is subject to the opposing pressures of the main reservoir and the train brake pipe, and the piston of the automatic application valve may have only a small feed groove, or none at all in its normal position, so that the instant the brake valve is turned to service application position the automatic application valve operates by preponderance of main reservoir pressure to compress the spring and open the supply port to the brake cylinder, but immediately upon turning the brake valve to lap position the pressure substantially equalizes upon opposite sides of the piston and the spring returns the same to its normal position, closing the supply to the brake cylinder. The exhaust from the brake cylinder is then controlled by the brake valve through the release pipe, so that the improved apparatus has all the advantages of the flexibility and prompt action of a straight air brake, together with the safety emergency features of the automatic air brake system.

In the accompanying drawings; Figure 1 is a diagram illustrating an air brake equipment embodying my improvements, as applied to two motor cars and a trailer coupled up in a train; Fig. 2 a vertical sectional view of one form of automatic application valve device which may be employed in my improved apparatus; Fig. 3 a plan view of the rotary valve seat of the motorman's brake valve; Fig. 4 a face view of the rotary valve; Figs. 5, 6, 7 and 8 diagrams illustrating the relative location of ports of the brake valve in release, service, lap, and emergency positions respectively; Fig. 9 a vertical section showing a slightly modified form of application valve device; Fig. 10 a plan of the slide valve seat; Fig. 11 a vertical section of a modified structure of motorman's brake valve; Fig. 12 a plan showing the ports in the seat of the form of brake valve shown in Fig. 11; Fig. 13 a face view of the rotary valve of this modification; and Figs. 14, 15, 16 and 17, diagrams illustrating the release, service, lap, and emergency positions of this form of motorman's brake valve.

This invention is particularly adapted for that class of service where two or more motor cars, or motor cars and trailers, may be coupled up in a train, as indicated in Fig. 1, where each motor car is provided with a motor driven air compressor 1, a main reservoir 2, electric pump governor 3, reservoir pipe 4 leading to a motorman's brake valve 5 at each end of the car, automatic brake pipe 6, and release pipe 7 extending through the train and connected to the automatic application valve device 8 and the motorman's brake valve 5. The application valve device is also connected to the reservoir pipe and to the brake cylinder 9. On the trailer car the auxiliary reservoir 2ª may be charged from the train brake pipe line.

As shown in Fig. 2, the application valve device 8 may comprise a casing containing a piston chamber 10 and valve chamber 11 having piston 12 and slide valve 13 with cavity 14 normally establishing communication between the release pipe 7, port 18 and the port 17 leading to the brake cylinder. The valve chamber communicates to the reservoir by pipe 4 and the piston chamber is connected to the train brake pipe 6, so that the piston 12 of the application valve device is subject to the opposing pressures of the brake pipe and reservoir and a small by-pass groove 16 may, if desired, be provided around the piston in its normal position. In this position the valve cuts off communication from the reservoir and valve chamber to the port 17 and the brake cylinder, and means, such as the light spring 15, is provided for moving the valve to this position when the fluid pressures substantially equalize upon opposite sides of the piston. An additional passage 19, having a check valve 20, may be employed for connecting the release pipe 7 to the brake cylinder.

In the form of brake valve illustrated in Figs. 3 to 8, the ports 21 and 22 in the valve seat communicate with the train brake pipe 6, the port 24 with the release pipe 7, and the exhaust port 23 with the atmosphere, while the rotary valve 25 is provided with cavities 28 and 29 and through ports 26 and 27. When the brake valve is placed in its normal or release position, Fig. 5, air under pressure from the main reservoir flows through pipe 4 to the chamber above the rotary valve 25 of the brake valve and through the ports 26 and 22 to the train brake pipe 6, and also through pipe 4 to the valve chamber 11, so that the piston of the application valve device remains substantially balanced as to fluid pressure. In this position of the brake valve the release pipe is open to the atmosphere through port 24, cavity 29 and exhaust port 23, and the brakes are off. If there is a trailer car coupled in the train, its reservoir 2ª will be charged from the train brake pipe through groove 16 to the normal maximum degree of main reservoir pressure. The brake valves, other than the one at the front of the head car, may be set in a position to blank all ports, or they may be cut out by means of cut out cocks located in their train brake pipe connections.

In order to make a service application of the brakes, the head brake valve is turned to service position, Fig. 6, in which a communication is opened for venting air from the train brake pipe to cause a reduction therein. This reduction may be made by opening a vent to the atmosphere, but I prefer to connect the same to the brake cylinder release pipe. In this position the cavity 28 in the rotary valve establishes communication from the brake pipe and port 21 to the port 24 and the brake cylinder pipe 7, which causes a reduction in the brake pipe and piston chamber 10, whereupon the higher pressure of the reservoir on the opposite side of the piston operates to compress the spring 15 and move the valve to open the brake cylinder port 17. Air then flows from the reservoir direct to the brake cylinder, charging the same to the desired degree. As long as the brake valve remains in service position the brake pipe pressure is held sufficiently lower than the reservoir pressure to maintain the application valve open in service position until equalization takes place. But whenever the brake valve is turned to its intermediate or "lap" position, Fig. 7, the reservoir pressure instantly equalizes into the train brake pipe through ports 27 and 22 and the spring 15 returns the piston and valve to normal position to cut off communication from the reservoir to the brake cylinder. In this position of the brake valve the port 24 of the brake cylinder pipe 7 is closed, so that the air is retained in the brake cylinder. The brakes may then be released or graded down, as desired, by turning the brake valve to release position in the usual manner of releasing an ordinary straight air brake. By means of this construction, the application valve device responds promptly to the movement of the brake valve to service and lap positions respectively to open and close the service port 17 from the reservoir to the brake cylinder, and the brake cylinder pressure may, in this manner, be graded up by suitable amounts to any desired degree or to the point of equalization of the reservoir and brake cylinder pressures. In this way, the manipulation of the brake valve is substantially the same as with a straight air brake and the apparatus has the same flexibility of control of the brake cylinder pressure with the added advantage of the quicker application of the air to the brake cylinders on the second or third cars, since the supply for each brake cylinder is furnished directly from the reservoir on each car. This apparatus also has the advantage of automatic safety or emergency features, as an emergency application of the brakes may be produced either by a pulling apart of the cars of the train, or by a movement of the brake valve to the emergency position, as indicated in Fig. 8. In this position, the train brake pipe is opened to the atmosphere through large ports 22, 29 and 23, thereby producing a sudden and heavy reduction in brake pipe pressure, whereupon the application valve makes its extreme movement, opening wide the brake cylinder port 17 and cutting off communication from the brake cylinder to the release pipe 7. The reservoir pressure then holds the application valve in this extreme position with its spring 15 compressed as long as the brake pipe remains empty or at a reduced pressure. In a similar manner, if the emergency application is produced by a break-in-two, the application valve device operates instantly to seal the outlet from the reservoir to the brake pipe, to equalize the reservoir pressure into the brake cylinder, and to cut off the outlet from the brake cylinder to the release pipe. In case of a brake-in-two the motorman should immediately turn his brake valve to emergency position, or a position in which all ports are blanked to disconnect the reservoir from the brake pipe. After an emergency application, the brake may be released by turning the brake valve to release position, whereupon the reservoir pressure slowly equalizes into the brake pipe through port 26, whereupon the spring 15 returns the valve to its normal position, connecting the brake cylinder to the release pipe and the air from the brake cylinders exhausts through ports 24 and 23 to the atmosphere. The apparatus may be purposely designed to give a somewhat slow release after an emergency application, in order to deter motormen from using the emergency application in ordinary service stops.

According to the modified form of application valve device shown in Fig. 9, the piston 12 is arranged to have a small free movement independent of the slide valve and spring 15, in order to move instantly under a reduction in brake pipe pressure to close the feed groove 16. The port 17 and cavity 14 are preferably adapted to establish communication between the brake cylinder and the port 18 and release pipe 7 in all positions of the application valve except emergency position, and with this construction the check valve 20 and passage 19, as shown in Fig. 2, may be dispensed with. For the purpose of equalizing the fluid pressure from the reservoir around the piston into the brake pipe when the piston is in service application position and the brake valve is turned to lap, one or more by-pass grooves 32 may be provided in the bushing of the piston chamber. An additional spring 15' may also be employed to oppose the extreme movement of the piston to its emergency position.

In Figs. 11 to 17, a slightly modified form of motorman's brake valve is shown, in which the ports 30 and 31 are used instead of the cavity 28 shown in Fig. 4, and the ports 21 and 27 are dispensed with. A small port 4' also connects the supply pipe 4 with the chamber above the rotary valve 25. According to this construction, the release position is substantially the same as before described, but when turned to service position, Fig. 16, for applying the brakes, air from the train brake pipe is vented to the brake cylinder release pipe through ports 22 and 31, the rotary valve chamber, and ports 30 and 24. The small amount of air flowing at this time from the supply port 4' into the valve chamber will not interfere at all in making the proper brake pipe reduction on account of the restricted size of port 4'. If desired, this port may be so arranged as to be closed in service application, but this is not necessary in practice. The reduction thus produced in the brake pipe pressure causes the piston 12 of the application valve to respond promptly and move the valve 13 to partially open the brake cylinder supply port 17 and compress the spring 15. In this service position of the application valve the brake cylinder communicates with the release pipe 7 through cavity 14 and port 18, and the equalizing grooves 32 are open around the piston 12. The capacity of these grooves is so calculated, however, with reference to vent ports 31 and 30 in the brake valve, that the application valve will remain in service position as long as the brake valve is held in its service position or until equalization of reservoir and brake cylinder pressure is effected. But the instant the brake valve is turned to lap position, Fig. 15, the reservoir pressure equalizes into the brake pipe through the grooves around the piston and the spring 15 immediately moves the valve to close the brake cylinder supply port 17. Under a great and sudden reduction in brake pipe pressure, as in emergency applications, the piston is forced out to its extreme position against the gasket, compressing both springs and closing the by-pass around the piston to the brake pipe and moving the valve to fully open the brake cylinder supply port 17 and cut off communication from the brake cylinder to the release pipe 7. The releasing action of this modified form of apparatus is substantially the same as that previously described.

It will be apparent that the equalization of fluid pressures upon opposite sides of the application valve piston, when the brake valve is turned to lap position, may be effected either by an equalizing port in the brake valve, as shown in Fig. 7, or by an equalizing passage around the piston, as indicated in Fig. 9.

By means of my improvements an automatic air brake is provided, which is specially adapted for service where two or more motor cars, or motors and trailers, are coupled up together, since the application valve on each car responds instantly to the variations in the train brake pipe pressure in service applications to open and close the brake cylinder supply port on each car, according to the corresponding movement of the brake valve, and the braking pressure on all the cars may be graded up or down with great ease, flexibility, and safety.

Having now described my invention, what I claim as new and desire to secure by Letters Patent, is:—

1. In an air brake, the combination with a reservoir, an automatic brake pipe, and brake cylinder, of a valve device operated by a reduction in brake pipe pressure in service applications to open communication from the reservoir to the brake cylinder, and a manually operated brake valve having means for controlling the supply of air from the reservoir to the brake pipe, for releasing air from the brake pipe in service applications, and for controlling the exhaust from the brake cylinder.

2. In an air brake, the combination with a reservoir, an automatic brake pipe, a brake cylinder, and a direct release pipe, of a valve device operated by a reduction in brake pipe pressure in service applications to open communication from the reservoir to the brake cylinder, and means acting upon an equalization of reservoir and brake pipe pressures to move said valve to open communication from the brake cylinder to said release pipe.

3. In an air brake, the combination with a reservoir, an automatic brake pipe, a brake cylinder, and a release pipe communicating with the brake cylinder, of a valve device operated by a reduction in brake pipe pressure in service applications to open communication from the reservoir to the brake cylinder, and a manually operated brake valve having means for controlling the supply of air from the reservoir to the brake pipe, for venting air from the brake pipe to the release pipe in service applications, and for controlling the exhaust from the release pipe.

4. In an air brake, the combination with a reservoir, an automatic brake pipe, brake cylinder, and a valve device operated by a reduction in brake pipe pressure in service applications to open communication from the reservoir to the brake cylinder, of a release pipe normally communicating with the brake cylinder, means for charging the brake pipe from the said reservoir, and a brake valve having ports for venting air from the brake pipe to the release pipe in service applications.

5. In an air brake, the combination with a reservoir, an automatic brake pipe, brake cylinder, and brake cylinder release pipe normally communicating therewith, of a valve device operated by a reduction in brake pipe pressure in service applications to open communication from the reservoir to the brake cylinder, and by a sudden reduction in brake pipe pressure in emergency applications to cut off communication from the brake cylinder to the release pipe, and a brake valve having means for venting air from the brake pipe and controlling the exhaust from the release pipe.

6. In an air brake, the combination with a reservoir, an automatic brake pipe, brake cylinder, and brake cylinder release pipe normally communicating therewith, of a valve device operated by a reduction in brake pipe pressure in service applications to open communication from the reservoir to the brake cylinder, and means acting to promptly return the valve to its normal position to close such communication upon equalization of reservoir and brake pipe pressures, and a brake valve having ports for venting air from the brake pipe in application position and for controlling the exhaust from the release pipe.

7. In an air brake, the combination with a reservoir, train brake pipe, brake cylinder, release pipe normally communicating with the brake cylinder, and an application valve device operated by a reduction in brake pipe pressure in service applications to open communication from the reservoir to the brake cylinder, and a spring acting to return said valve to cut off said communication, of a brake valve having ports for venting air from the brake pipe in service applications, and for controlling the exhaust from the release pipe, and means for effecting a prompt equalization of fluid pressures upon opposite sides of said application valve device upon movement of the brake valve to lap position.

8. In an air brake, the combination with a reservoir, a train brake pipe, a brake cylinder, a release pipe normally communicating with the brake cylinder, means for charging the brake pipe from the said reservoir, and an application valve device operated by a reduction in brake pipe pressure in service applications to open communication from the reservoir to the brake cylinder, of a brake valve having ports for venting air from the brake pipe and for controlling the exhaust from the release pipe.

9. In an air brake, the combination with a reservoir, a train brake pipe, a brake cylinder, a release pipe normally communicating with the brake cylinder, means for charging the brake pipe from the said reservoir, and an application valve device operated by a reduction in brake pipe pressure in service applications to open communication from the reservoir to the brake cylinder, of means for normally returning the valve device to cut off said communication, and a brake valve having ports for controlling the brake pipe pressure and the exhaust from the release pipe.

10. In an air brake, the combination with a reservoir, a train brake pipe, a brake cylinder, a release pipe normally communicating with the brake cylinder, and an application valve device operated by a reduction in brake pipe pressure in service applications to open communication from the reservoir to the brake cylinder, of a brake valve having pipe connections with the reservoir, the brake pipe, and the release pipe.

11. In an air brake, the combination with a reservoir, a train brake pipe and a brake cylinder, of an application valve for controlling the supply of air from the reservoir to the brake cylinder, a piston subject to the opposing pressures of the reservoir and brake pipe for operating said application valve, a spring acting to oppose the opening movement of said application valve, and means for opening a by-pass around said piston in its service application position.

12. In an air brake, the combination with a reservoir, an automatic brake pipe adapted to be charged from the reservoir, brake cylinder and a release pipe normally communicating with the brake cylinder, of an application valve device operated by a reduction in brake pipe pressure in service applications to open communication from the reservoir to the brake cylinder, and a brake valve for controlling the exhaust from the release pipe.

13. In a fluid pressure brake, the combination with a reservoir, automatic brake pipe, and a brake cylinder, of an automatic valve device operating upon a reduction in brake pipe pressure to supply air from the reservoir to the brake cylinder, a check valve for preventing flow of air from said valve device to the reservoir, a manually operated valve, and a pipe in open communication with the brake cylinder in one position of the automatic valve device and connected to said manually operated valve.

14. In a fluid pressure brake, the combination with a train pipe and brake cylinder, of an automatic valve device operating in response to a reduction in train pipe pressure for supplying air to the brake cylinder, a brake valve having means for controlling communication to a direct passage leading to the brake cylinder, said direct passage having one branch leading to the brake cylinder, communication through which is controlled by said automatic valve device, and another branch provided with a check valve.

In testimony whereof I have hereunto set my hand.

WALTER V. TURNER.

Witnesses:
R. F. EMERY,
J. B. MACDONALD.